(12) United States Patent
Morrison et al.

(10) Patent No.: US 10,857,993 B2
(45) Date of Patent: Dec. 8, 2020

(54) METHODS AND SYSTEM ACTIVATING A VEHICLE

(71) Applicant: Ford Global Technologies, LLC, Dearborn, MI (US)

(72) Inventors: Kendrick Morrison, Wayne, MI (US); Andrew E. Burt, Royal Oak, MI (US); Christopher A. Lear, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 171 days.

(21) Appl. No.: 16/126,891

(22) Filed: Sep. 10, 2018

(65) Prior Publication Data

US 2020/0079350 A1 Mar. 12, 2020

(51) Int. Cl.
*B60W 10/02* (2006.01)
*B60W 20/15* (2016.01)
*B60W 20/40* (2016.01)
*B60K 6/48* (2007.10)

(52) U.S. Cl.
CPC .......... *B60W 20/15* (2016.01); *B60W 10/023* (2013.01); *B60W 10/026* (2013.01); *B60W 20/40* (2013.01); *B60K 2006/4825* (2013.01); *B60W 2510/0275* (2013.01); *B60W 2710/083* (2013.01); *B60Y 2200/92* (2013.01)

(58) Field of Classification Search
None
See application file for complete search history.

(56) References Cited

U.S. PATENT DOCUMENTS 5,115,694 A 5/1992 Sasaki et al.
7,293,552 B2* 11/2007 Leone ................... F02D 19/081
123/519
2006/0058154 A1 3/2006 Heckel et al.

* cited by examiner

*Primary Examiner* — Justin Holmes
(74) *Attorney, Agent, or Firm* — David Kelley; McCoy Russell LLP

(57) ABSTRACT

Systems and methods for operating a hybrid powertrain or driveline that includes an engine and an integrated starter/generator are described. In one example, the integrated starter/generator may rotate a torque converter during a vehicle activation process if a vehicle soak time exceeds a threshold. The integrated starter/generator may not rotate the torque converter during a vehicle activation process if a vehicle soak time is less than the threshold.

20 Claims, 7 Drawing Sheets

METHODS AND SYSTEM ACTIVATING A VEHICLE

FIELD

The present description relates to methods and a system for operating a powertrain of a hybrid vehicle. The methods and systems may be particularly useful for hybrid vehicles that include an integrated starter/generator and an automatic transmission.

BACKGROUND AND SUMMARY

A hybrid powertrain or driveline may include an engine and an electric machine to provide propulsive effort. The engine may be operated when driver demand torque is high and when battery charge is low so that a desired level of vehicle performance may be achieved. If driver demand torque is low, the engine may not be operated and the electric machine may provide propulsive effort to the vehicle. If the hybrid vehicle is parked and stationary for a long period of time, the hybrid vehicle may not initially perform as may be expected. In particular, the vehicle may not launch as expected and the vehicle may accelerate slower than is expected. The driver of the vehicle may become concerned or agitated by the reduction in vehicle performance. Therefore, it may be desirable to provide a way of maintaining a desired level of vehicle performance even if a hybrid vehicle has been parked for an extended period of time.

The inventors herein have recognized the above-mentioned issue and have developed a powertrain operating method, comprising: via a controller, rotating a torque converter impeller during a vehicle activation sequence while a vehicle soak time is indicative of less than a threshold amount of fluid in a torque converter; and via the controller, not rotating the torque converter impeller during the vehicle activation sequence while the vehicle soak time is indicative of more than the threshold amount of fluid in the torque converter.

By rotating the torque converter impeller after extended vehicle soak period, fluid that has drained from a torque converter may be replenished so that the torque converter may transfer torque from a torque converter impeller to a torque converter turbine as expected. On the other hand, if the vehicle soak period is short, the torque converter impeller may not be rotated during a vehicle activation sequence so that energy may be conserved. In this way, an expected level of vehicle performance may be maintained after long or short vehicle soak periods. Further, energy may be conserved after short vehicle soak periods by not rotating the torque converter impeller because there may be sufficient fluid within the torque converter to provide a desired level of vehicle launch performance.

The present description may provide several advantages. Specifically, the approach may provide for more consistent hybrid vehicle launch performance independent of vehicle soak time. In addition, the approach may conserve energy by recognizing that the torque converter has capacity to transfer a desired amount of torque without first rotating the torque converter. Further, the approach may be applied to a variety of hybrid vehicle configurations.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
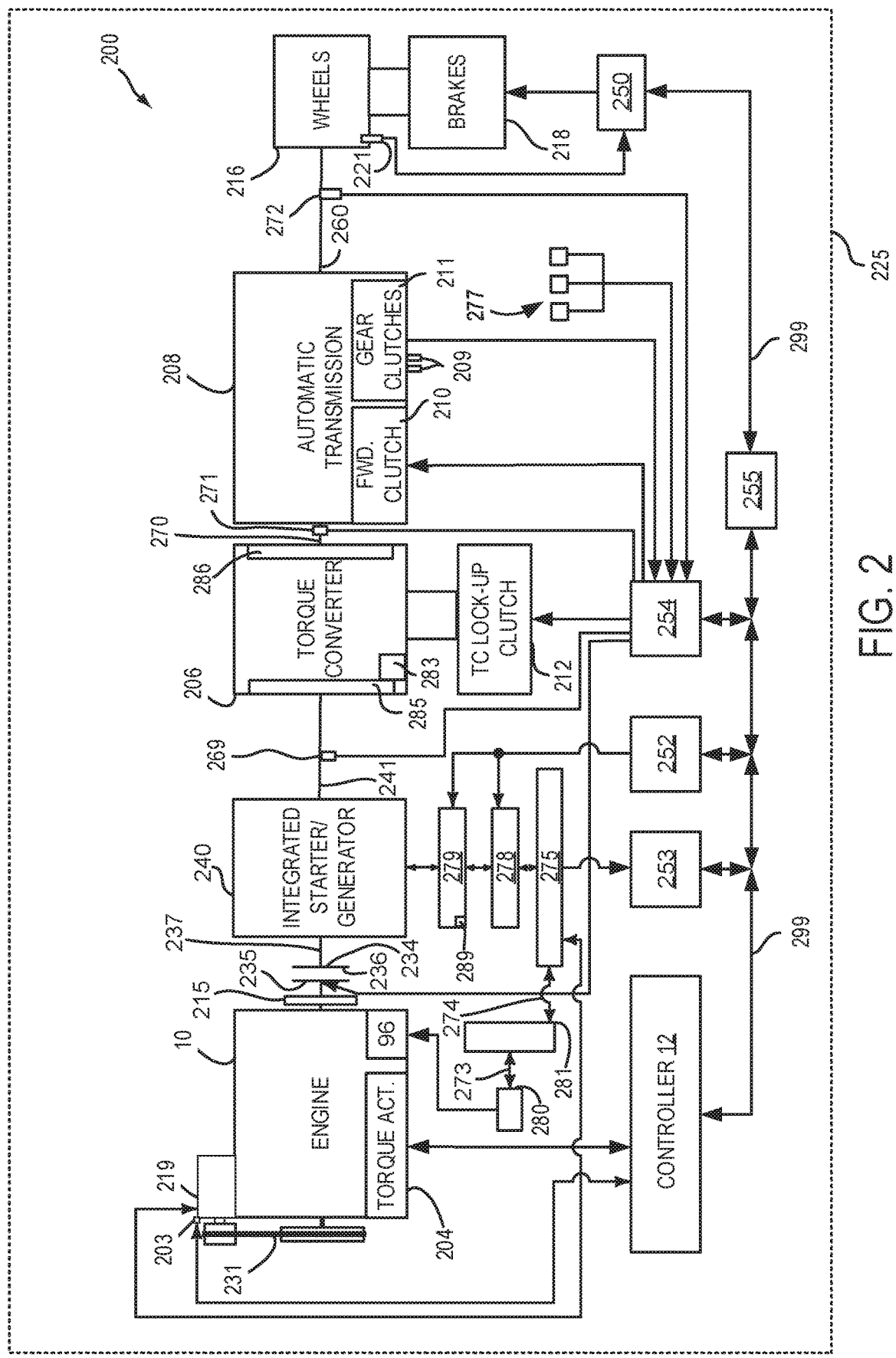
FIG. 2 is a schematic diagram of a hybrid vehicle driveline.
Figure 3:
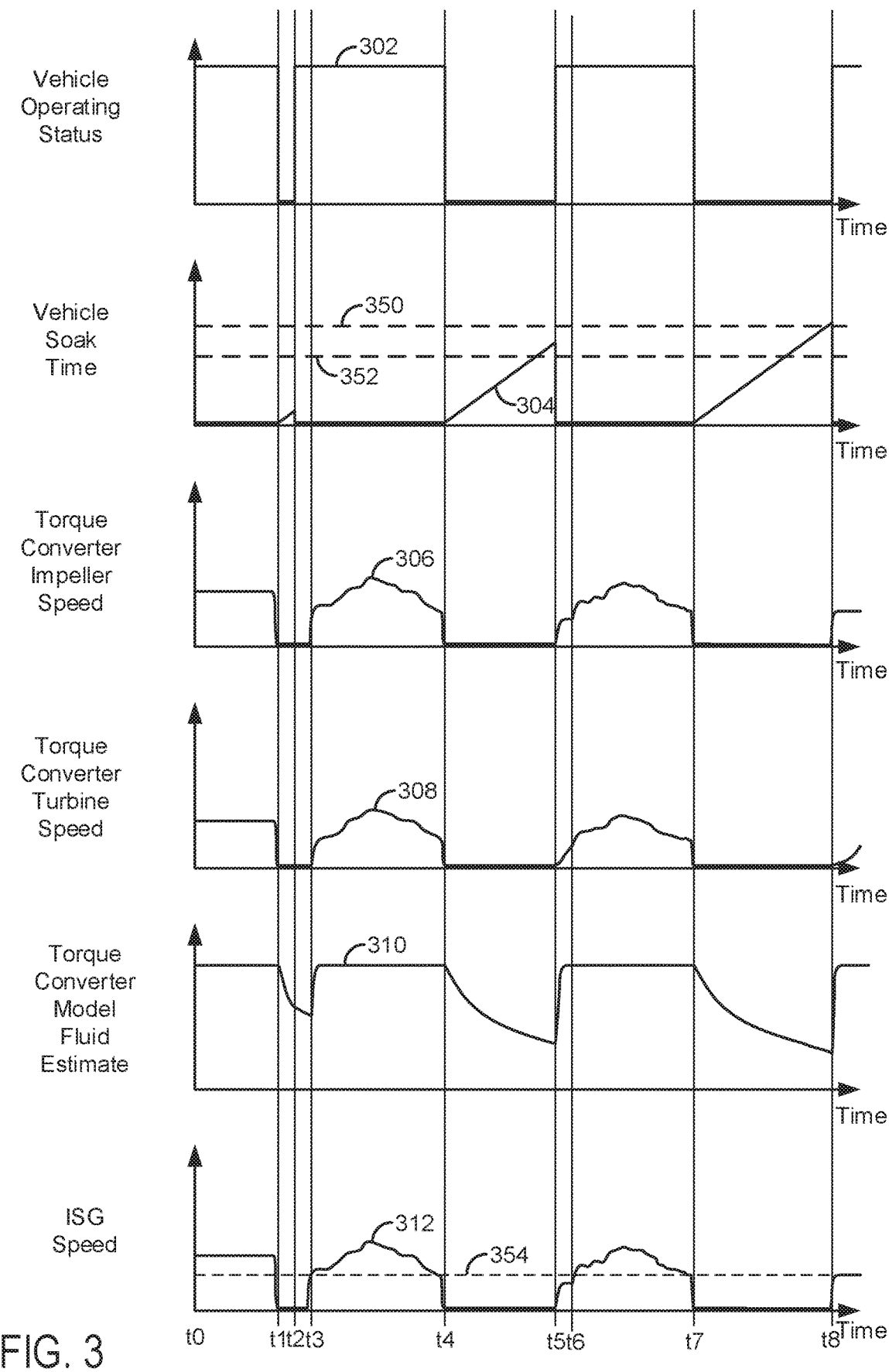
FIG. 3 shows an example vehicle operating sequence.
Figure 5:
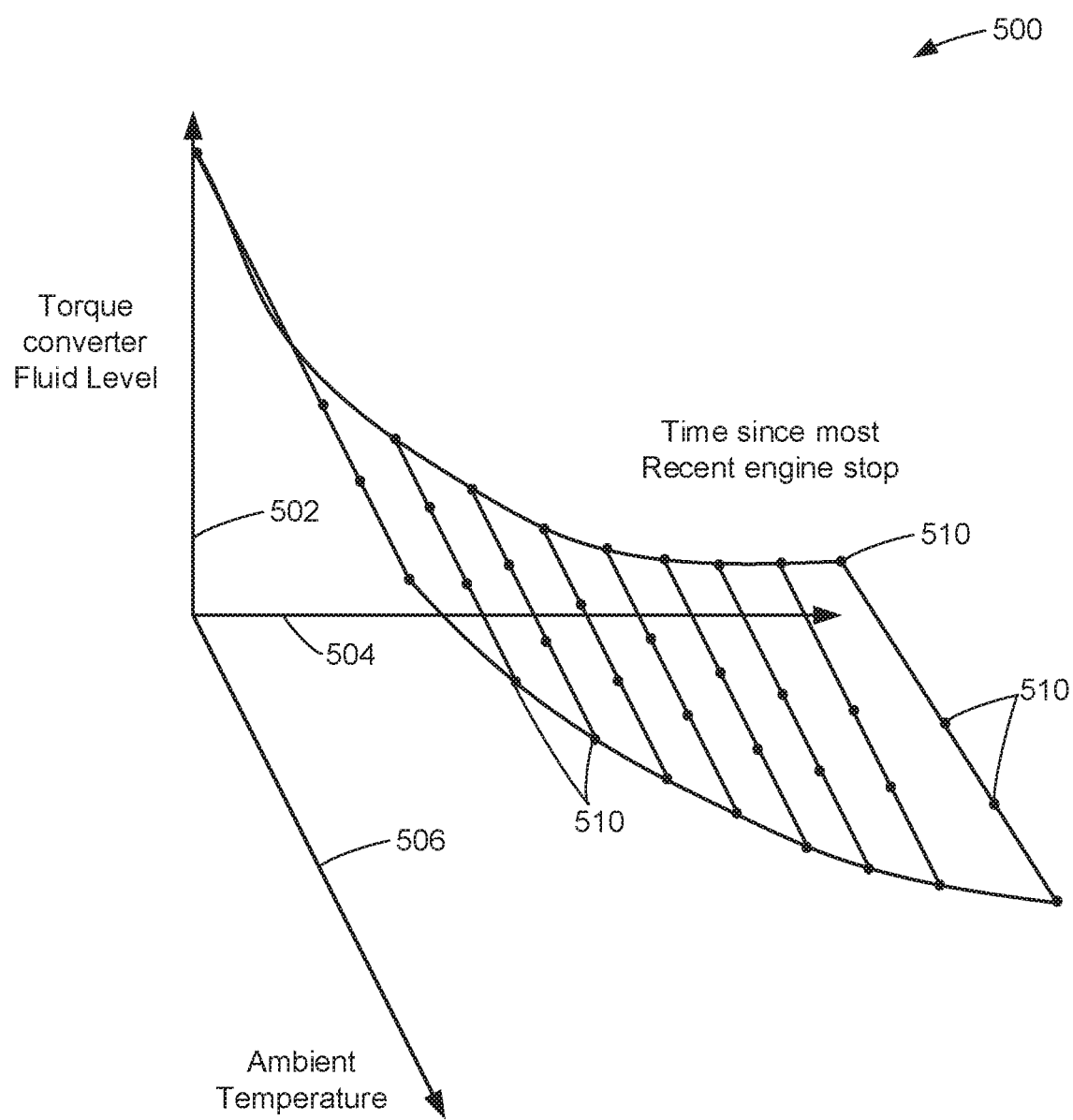
FIG. 5 shows an example empirical model of torque converter leakage.
Figure 6:
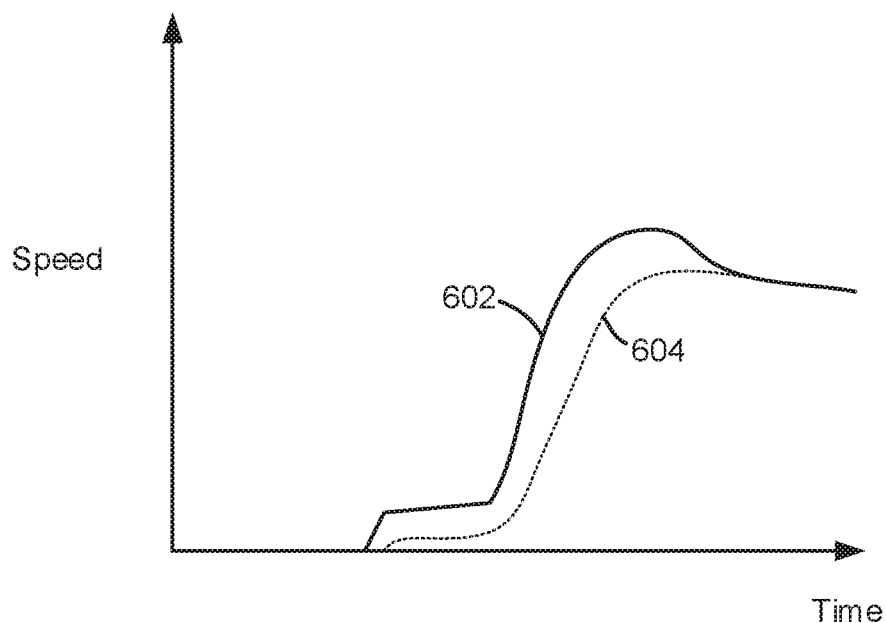
FIGS. 6 and 7 show how torque converter turbine speed is influenced by an amount of fluid in a torque converter.
Figure 7:
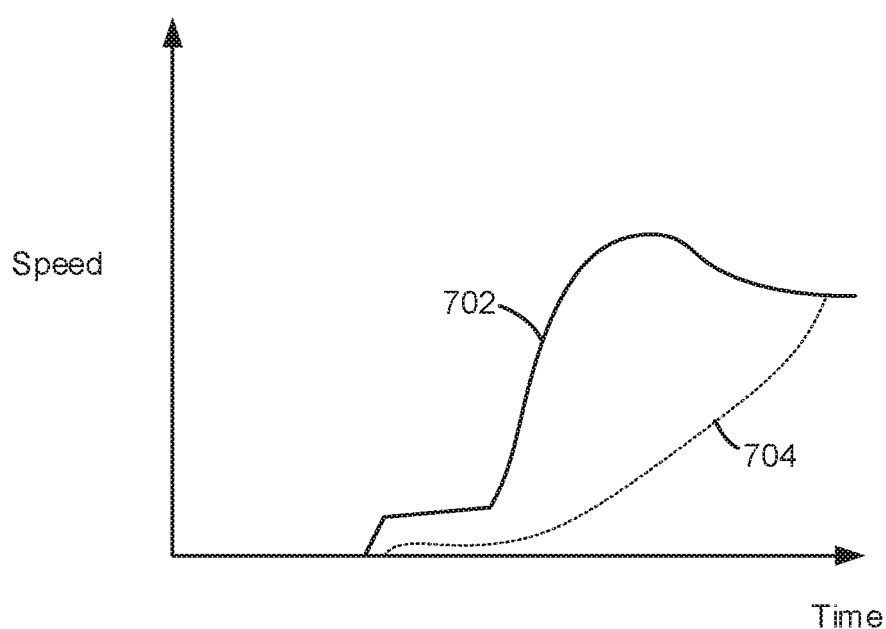
Figure 8:
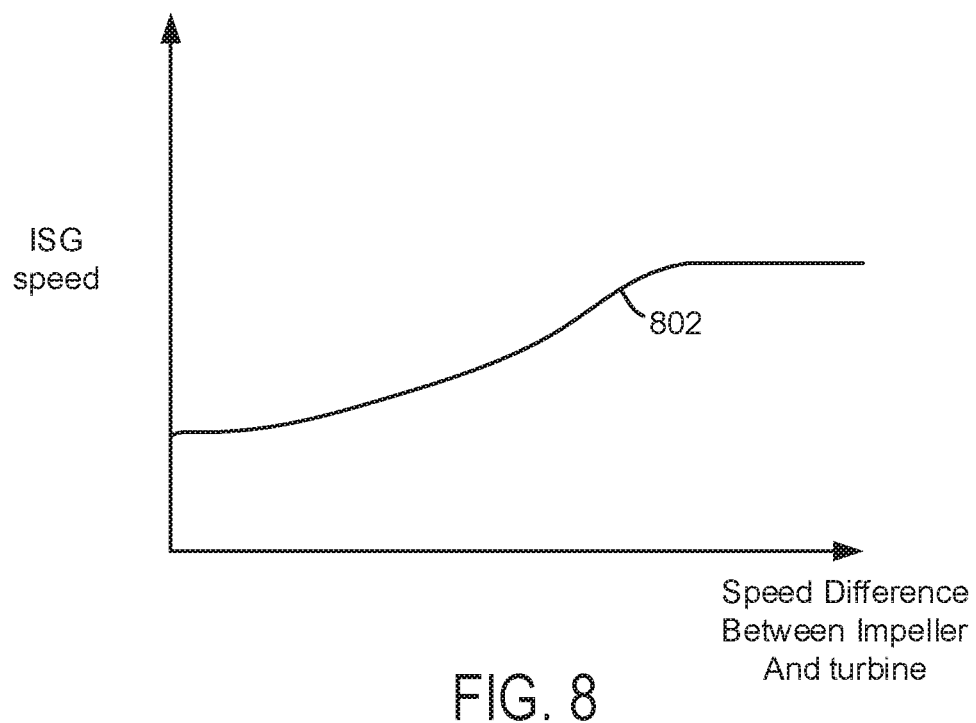
FIG. 8 shows how ISG speed may be adjusted according to a speed difference between a torque converter impeller and a torque converter turbine.

The present description is related to operating a hybrid vehicle that includes a torque converter. The hybrid vehicle may include an engine of the type shown in FIG. 1. The engine and an integrated starter/generator (ISG) may be included in a driveline of a hybrid vehicle as shown in FIG. 2. The ISG may be selectively operated during a vehicle activation sequence to fill the torque converter with fluid before the vehicle's driver shifts the vehicle into forward or reverse so that when the vehicle's driver demands torque to propel the vehicle, the vehicle responds as expected. The hybrid vehicle's ISG and engine may be operated as shown in the sequence of FIG. 3 to improve vehicle launch and conserve energy. The vehicle operating sequence of FIG. 3 may be provided via the method of FIG. 4. A three dimensional table that provides an empirical model of torque converter leakage is shown in FIG. 5. Plots of torque converter turbine speed and torque converter impeller speed after driveline rotation begins after driveline stop are shown in FIGS. 6 and 7. A plot that shows how ISG speed may be adjusted according to a speed difference between a torque converter turbine speed and a torque converter impeller speed is shown in FIG. 8.

Figure 1:
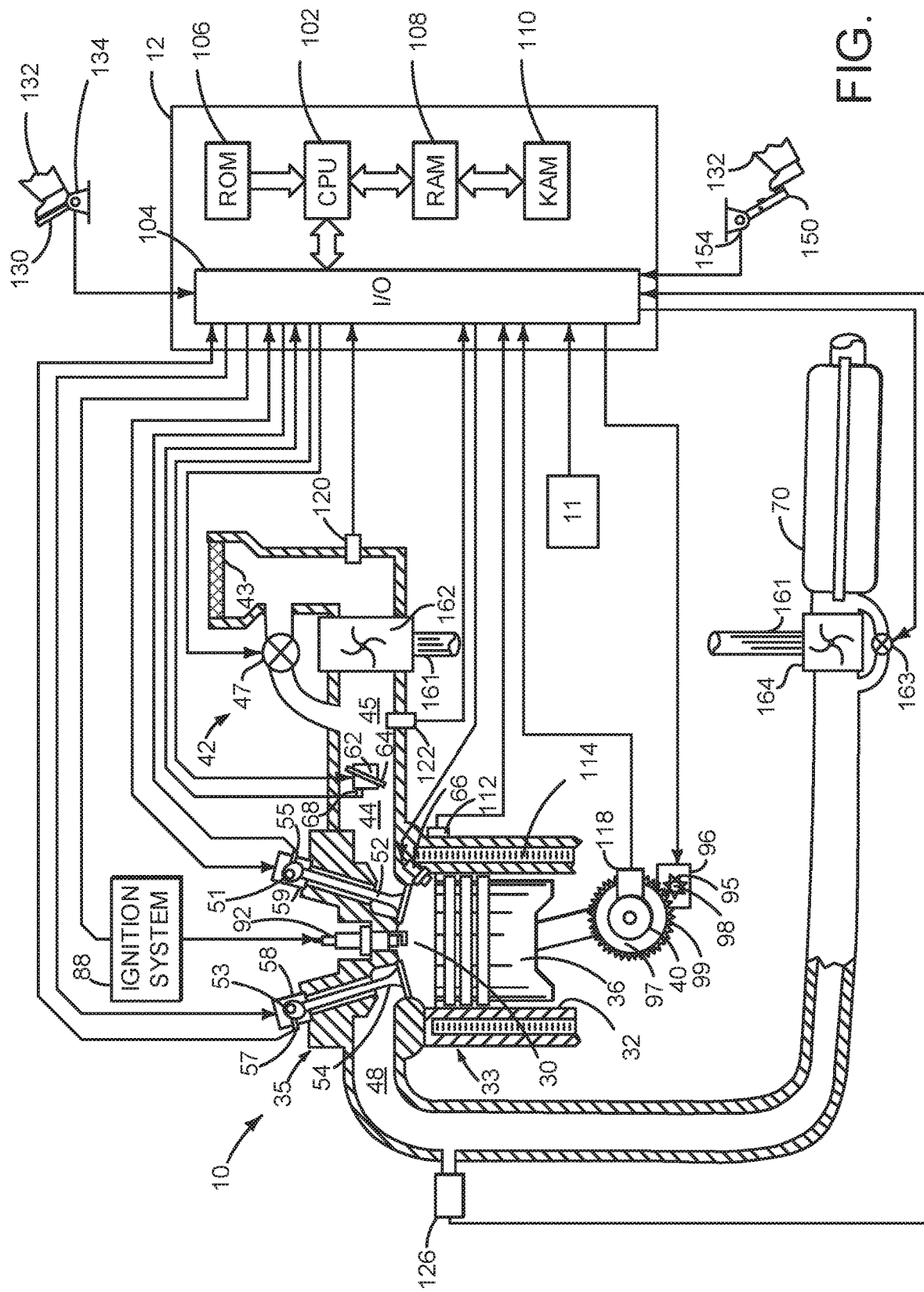
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller 12 employs the actuators shown in FIGS. 1 and 2 to adjust engine operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Wastegate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch, or other known input/output device. In some examples, human/machine interface may include a combination of pushbuttons/key switches and a display.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, the partitioning of powertrain controlling devices may be different than that shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started with an engine starting system shown in FIG. 1, via belt integrated starter/generator (BISG) 219, or via driveline integrated starter/generator (ISG) 240 also known as an integrated starter/generator. A speed of BISG 219 may be determined via optional BISG speed sensor 203. In some examples, BISG 219 may be simply referred to as an ISG. Driveline ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

BISG 219 may be mechanically coupled to engine 10 via belt 231. BISG 219 may be coupled to crankshaft 40 or a camshaft (e.g., 51 or 53 of FIG. 1). BISG 219 may operate as a motor when supplied with electrical power via electric energy storage device 275 or low voltage battery 280. BISG 219 may operate as a generator supplying electrical power to electric energy storage device 275 or low voltage battery 280. Bi-directional DC/DC converter 281 may transfer electrical energy from a high voltage bus 274 to a low voltage bus 273 or vise-versa. Low voltage battery 280 is electrically coupled to low voltage bus 273. Electric energy storage device 275 is electrically coupled to high voltage bus 274. Low voltage battery 280 selectively supplies electrical energy to starter motor 96.

An engine output torque may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 is in electrical communication with inverter 279, switch 278, and energy storage device 275.

Switch 278 may be closed during a vehicle activation sequence to supply DC power from electric energy storage device 275 to inverter 279. Switch 278 may be opened during a vehicle deactivation sequence to cut-off the supply of DC power from electric energy storage device 275 to inverter 279. Switch 278 may be a solid state device or an electro-mechanical switch. Inverter 279 may convert DC power into AC power for operating ISG 240 as a motor. Inverter 279 may convert AC power to DC power when ISG 240 is operating in a generator mode. In some examples, switch 278 may be incorporated into energy storage device 275 or inverter 279. Inverter 279 may include internal switches 289 that may be selectively opened and closed to convert alternating current (AC) electrical power to direct current (DC) electrical power or vice-versa. Switches 289 may prevent or allow electrical current flow to ISG 240. Thus, switches 289 may activate or deactivate ISG 240.

ISG 240 has a higher output torque capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed gear ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the ISG or BISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-lock and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

The system of FIGS. 1 and 2 provides for a system, comprising: an engine; an integrated starter/generator (ISG); a driveline disconnect clutch coupled to the engine and the ISG; a transmission including a torque converter coupled to the ISG, the torque converter including an impeller and a turbine; and a controller including executable instructions stored in non-transitory memory to rotate the impeller at a first speed via the controller for vehicle soak times greater than a first amount of time and less than a second amount of time, and to rotate the impeller at a second speed for vehicle soak times greater than the second amount of time via the controller. The system includes where the vehicle soak time is a time period during which all vehicle powertrain torque sources are not supplied with energy and the vehicle is stationary. The system further comprises additional instructions to generate the first amount of time based on a torque converter draining model. The system further comprises additional instructions to rotate the impeller via the electric machine in a speed control mode and not via the engine. The system includes where the electric machine is rotated at an idle speed of the engine. The system further comprises additional instructions to rotate the impeller via the engine in a speed control mode in response to a battery state of charge being less than a threshold.

Referring now to FIG. 3, example plots of a vehicle operating sequence are shown. The operating sequence may be performed via the system of FIGS. 1 and 2 in cooperation with the method of FIG. 4. Vertical lines at times t0-t8 represent times of interest during the sequence. The plots in FIG. 3 are time aligned and occur at the same time.

The first plot from the top of FIG. 3 is a plot of vehicle operating status versus time. The vertical axis represents vehicle operating status and the vehicle is activated when trace 302 is at a higher level near the vertical axis arrow. The vehicle is deactivated when trace 302 is at a lower level near the horizontal axis. Trace 302 represents vehicle operating state. The horizontal axis represents time and time increases from the left side of the figure to the right side of the figure.

The second plot from the top of FIG. 3 is a plot of vehicle soak time versus time. The vertical axis represents vehicle soak time and vehicle soak time increases in the direction of the vertical axis arrow. The vehicle soak time (e.g., starts accumulating) when the vehicle is deactivated. The vehicle soak time ends when the vehicle is activated after being deactivated. Trace 304 represents vehicle soak time. The horizontal axis represents time and time increases from the left side of the figure to the right side of the figure. Horizontal line 350 represents a second vehicle soak time threshold. Horizontal line 352 represents a first vehicle soak time threshold.

The third plot from the top of FIG. 3 is a plot of torque converter impeller speed versus time. The vertical axis represents torque converter impeller speed and torque converter impeller speed increases in the direction of the vertical axis arrow. Trace 306 represents torque converter impeller speed. The horizontal axis represents time and time increases from the left side of the figure to the right side of the figure.

The fourth plot from the top of FIG. 3 is a plot of torque converter turbine speed versus time. The vertical axis represents torque converter turbine speed and torque converter turbine speed increases in the direction of the vertical axis arrow. Trace 308 represents torque converter turbine speed. The horizontal axis represents time and time increases from the left side of the figure to the right side of the figure.

The fifth plot from the top of FIG. 3 is a plot of a torque converter model fluid estimate versus time. The vertical axis represents an estimated amount of fluid in a torque converter and the estimated amount of fluid in the torque converter impeller speed increases in the direction of the vertical axis arrow. Trace 310 represents an amount of fluid in a torque converter. The horizontal axis represents time and time increases from the left side of the figure to the right side of the figure.

The sixth plot from the top of FIG. 3 represents ISG speed versus time. The vertical axis represents ISG speed and ISG speed increases in the direction of the vertical axis arrow. Trace 312 represents ISG speed. The horizontal axis represents time and time increases from the left side of the figure to the right side of the figure. Horizontal line 354 represents an idle speed of an internal combustion engine.

At time t0, the vehicle is activated and vehicle soak time is zero. The torque converter impeller speed is at a middle level and the ISG speed is the same as the torque converter impeller speed since the ISG is coupled to the torque converter impeller. The torque converter turbine speed is also at a middle level, but the torque converter turbine speed is lower than the torque converter turbine speed since the torque converter is unlocked. The torque converter fluid level is at a high level since the transmission pump is supplying pressurized fluid throughout the transmission.

Between time t0 and time t1, the ISG speed is reduced to zero. The torque converter impeller speed and turbine speed are also reduced to zero as the vehicle stops.

At time t1, the vehicle is deactivated via a human driver (not shown) and the soak timer begins incrementing. The torque converter impeller speed and torque converter turbine speed are zero. The transmission fluid pump ceases pumping (not shown) and the estimated fluid level in the torque converter begins to be reduced. The ISG speed is zero.

At time t2, the vehicle is reactivated and the vehicle soak timer is reduced to zero when the vehicle is activated. Because the vehicle is deactivated for a short amount of time (e.g., the vehicle soak time is less than first threshold 352), the estimated amount of fluid in the torque converter is high. As such, the ISG is not rotated upon vehicle activation to conserve electrical energy. The torque converter impeller and turbine speeds remain zero.

At time t3, the driver demand torque is increased (not shown) to move the vehicle. The ISG speed is increased as the ISG is operated in torque control mode and the ISG responds to the driver demand torque. The torque converter impeller begins to rotate when the ISG rotates and the torque converter turbine speed begins to increase as torque is transferred from the torque converter impeller to the torque converter turbine. Rotating the torque converter impeller activates the transmission pump (not shown), thereby increasing the amount of fluid in the torque converter.

Between time t3 and time t4, the ISG torque follows the driver demand torque (not shown) causing the torque converter impeller speed and turbine speed to vary over time. The vehicle soak time remains zero and the vehicle remains activated. This ISG stops rotating near time t4 in response to a low driver demand torque.

At time t4, the vehicle is deactivated via a human driver (not shown) and the soak timer begins incrementing. The torque converter impeller speed and torque converter turbine speed are zero. The transmission fluid pump ceases pumping (not shown) and the estimated fluid level in the torque converter begins to be reduced. The ISG speed is zero.

At time t5, the vehicle is reactivated and the vehicle soak timer is reduced to zero when the vehicle is activated.

However, before the soak timer is reduced to zero its value is determined and it is found to exceed first threshold 352. Because the vehicle is deactivated for a longer amount of time, the estimated amount of fluid in the torque converter is lower due to torque converter fluid drainage. Accordingly, the ISG is operated in a speed control mode during the vehicle activation sequence and it is rotated at a speed that is less than an engine idle speed. By rotating the ISG, the transmission pump delivers fluid to the torque converter. And, because the torque converter is partially filled with fluid, the ISG may rotate at a speed that is lower than engine idle speed to reduce energy consumption. The torque converter impeller and turbine speed begin to increase, but torque converter turbine speed is significantly lower than torque converter impeller speed since there is a lower amount of fluid in the torque converter.

At time t6, the driver demand torque is increased (not shown) to move the vehicle. The ISG transitions from speed control mode to torque control mode in response to the increase in driver demand torque. The ISG torque is increased as in response to the driver demand torque, thereby increasing the ISG speed. The torque converter turbine speed more closely tracks torque converter impeller speed because the torque converter is filled with fluid.

Between time t6 and time t7, the ISG torque follows the driver demand torque (not shown) causing the torque converter impeller speed and turbine speed to vary over time. The vehicle soak time remains zero and the vehicle remains activated.

At time t7, the vehicle is deactivated via a human driver (not shown) and the soak timer begins incrementing. The torque converter impeller speed and torque converter turbine speed are zero. The transmission fluid pump ceases pumping (not shown) and the estimated fluid level in the torque converter begins to be reduced. The ISG speed is zero.

At time t8, the vehicle is reactivated and the vehicle soak timer is reduced to zero when the vehicle is activated. However, before the soak timer is reduced to zero its value is determined and it is found to exceed second threshold 350. Because the vehicle is deactivated for a long amount of time, the estimated amount of fluid in the torque converter is even lower due to torque converter fluid drainage. Therefore, the ISG is operated in a speed control mode during the vehicle activation sequence and it is rotated at an engine idle speed. By rotating the ISG at engine idle speed, the transmission pump delivers more fluid to the torque converter. Further, if it is desirable to start the engine due to low battery charge or another condition, the driveline is already at engine idle speed so the engine does not have to accelerate the driveline. The torque converter impeller and turbine speed begin to increase, but torque converter turbine speed is much lower than torque converter impeller speed since there is a lower amount of fluid in the torque converter. The sequence ends shortly after time t8.

In this way, an ISG may rotate at different speeds during a vehicle activation sequence according to an amount of time that may be indicative of an amount of fluid that is in a torque converter. If the torque converter is full of fluid before vehicle activation, the ISG may not rotate to conserve energy until a higher demand torque is requested. If the torque converter fluid level is low, the ISG may be rotated when there is zero driver demand torque input so that the torque converter may be recharged with fluid so that vehicle launch (e.g., acceleration from zero vehicle speed) may be improved.

Figure 4:
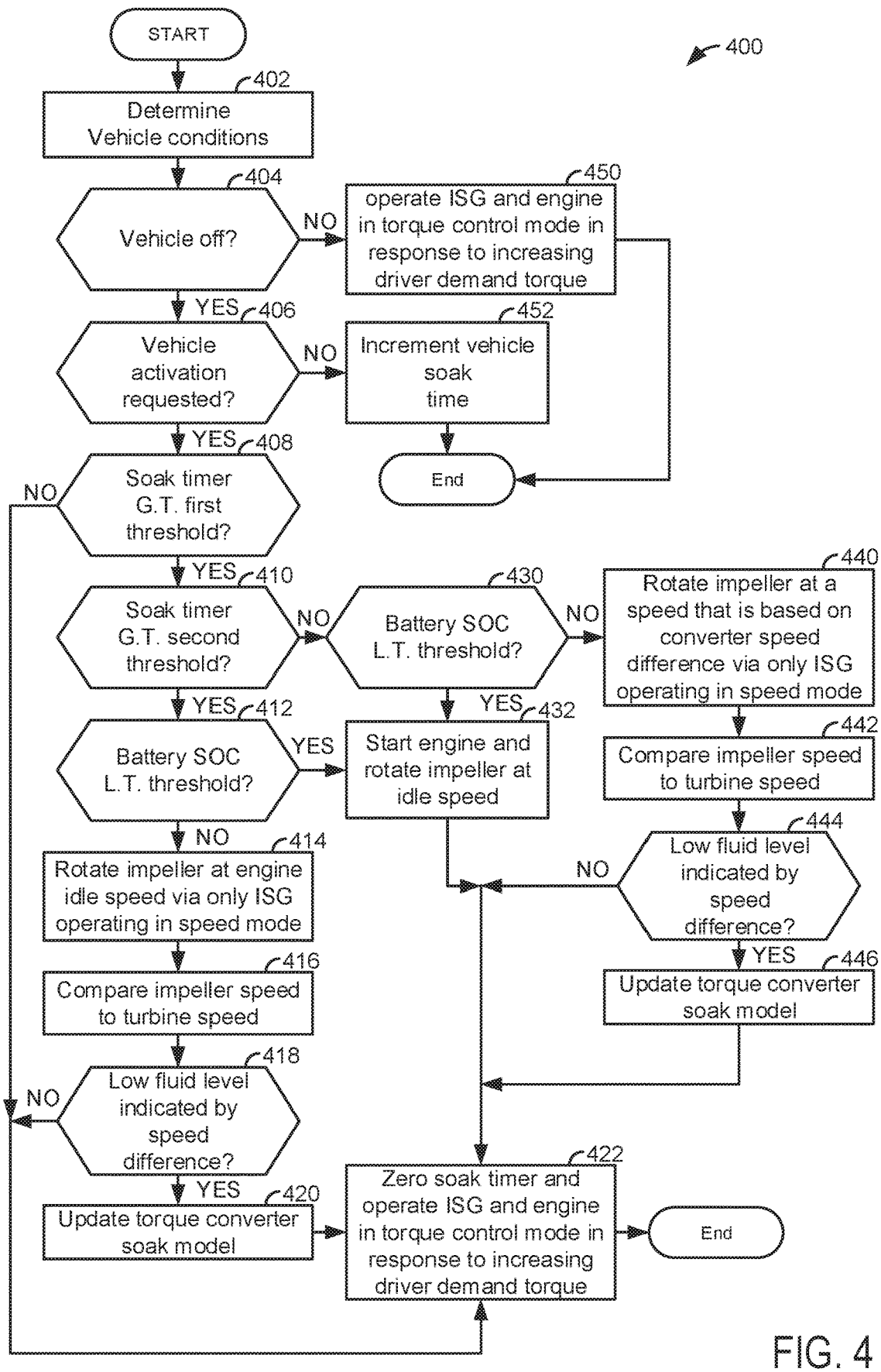
FIG. 4 describes a method for operating a hybrid vehicle.

Referring now to FIG. 4, a flow chart of a method for operating a hybrid vehicle is shown. The method of FIG. 4 may be incorporated into and may cooperate with the system of FIGS. 1 and 2. Further, at least portions of the method of FIG. 4 may be incorporated as executable instructions stored in non-transitory memory while other portions of the method may be performed via a controller transforming operating states of devices and actuators in the physical world.

At 402, method 400 determines vehicle operation conditions. Vehicle operating conditions may include but are not limited to engine speed, engine temperature, ISG speed, ISG torque, driver demand torque, engine load, ambient temperature, ambient pressure, vehicle speed, and battery state of charge (SOC), torque converter impeller speed, and torque converter turbine speed. The operating conditions may be determined via the various sensors described herein. For example, driver demand torque may be determined via sensing a voltage output via an accelerator pedal position sensor and the voltage may be converted into a driver demand torque via a function that outputs driver demand torque as a function of accelerator pedal position and vehicle speed. Values in the function may be empirically determined via operating the vehicle and determining values to install in the function based on vehicle drivability. Method 400 proceeds to 404.

At 404, method 400 judges if the vehicle is off or deactivated. In one example, the vehicle may be determined to be off or deactivated when a human or autonomous driver requests the vehicle off. The vehicle may be requested off via a human/machine interface or via a signal provided to a vehicle system controller. In one example, the vehicle's internal combustion engine ceases to rotate via ceasing fuel flow and spark to the engine when the vehicle is deactivated. Additionally, electrical power may be prevented from flowing to electrical machines that may provide torque to the vehicle driveline (e.g., ISG 240) when the vehicle is deactivated. Electrical power may be prevented from flowing to the electrical machines via opening a switch, deactivating an inverter, or other known way. If method 400 judges that the vehicle is off or deactivated, the answer is yes and method 400 proceeds to 406. Otherwise, the answer is yes and method 400 proceeds to 450.

At 450, method 450 operates the ISG and the engine in a torque control mode to provide an amount of torque requested by the human or autonomous driver. The engine torque may be increased or decreased via opening and closing a throttle along with adjusting an amount of fuel that is injected to the engine. Torque output from the ISG may be increased via increasing an amount of electrical power that is delivered to the ISG. Torque output from the ISG may be decreased via decreasing an amount of electric power that is delivered to the ISG. Additionally, a human driver may request that the vehicle be deactivated and the vehicle may be deactivated if the vehicle is activated. Method 400 proceeds to exit.

At 406, method 400 judges if vehicle activation is requested. The vehicle may be requested to be activated via an input to the human/machine interface or via a signal provided to a vehicle system controller. In one example, activating the vehicle may include starting the internal combustion engine and combusting fuel in the engine. Starting the engine may occur when battery SOC is low, when the ISG is not available to provide torque to the vehicle driveline, or during other conditions. However, if battery SOC is high and the ISG is available to provide torque to the driveline, then the engine may remain off (e.g., not combusting fuel) to conserve fuel while the ISG provides torque to the vehicle driveline. Nevertheless, even if the engine remains off, activating the vehicle may include supplying fuel at a threshold pressure to engine fuel injectors so that the engine is ready to start in case driver demand increases or battery charging is desired. Activating the vehicle may also include supplying electric power from an electric energy storage device to an inverter that selectively supplies electric power to the ISG so that the ISG may be rotated, if desired. In one example, a switch is closed to supply electric power to the inverter during a vehicle activation sequence. The ISG may not rotate even though the inverter is supplied with electric power because electric power may not be delivered to the ISG by the inverter until switches within the inverter begin opening and closing in response to driver demand torque or other vehicle conditions. In this way, the engine and the ISG are readied to provide torque to the vehicle driveline during a vehicle activation sequence. If method 400 judges that the vehicle activation is requested, the answer is yes, the vehicle is activated, and method 400 proceeds to 408. Otherwise, the answer is no, the vehicle is not activated, and method 400 proceeds to 452.

At 452, the vehicle soak timer is incremented. By incrementing the soak timer, it is possible to determine how long the vehicle has been deactivated since a most recent time the vehicle was deactivated. The amount of time that the vehicle is deactivated may be indicative of an amount of fluid that may have drained from the torque converter while the vehicle was deactivated. The soak timer may be a timer that is incorporated within the CPU of the controller. Method 400 proceeds to exit after incrementing the vehicle soak timer.

At 408, method 400 reads the soak timer value and determines if the vehicle soak time is greater than a first threshold amount of time. The first threshold amount of time may be an output from a torque converter model that estimates an amount of fluid that is held within the torque converter. The first threshold amount of time may be related to an amount of fluid in the torque converter. For example, the first threshold amount of time may correspond to 75% of the volume of the torque converter that is available to hold fluid. The first threshold amount of time may be adapted to increase or decrease depending on the comparison between torque converter impeller speed and torque converter turbine speed determined at 416 and 442. In one example, the first threshold amount of time is determined via referencing an empirical model that is in the form of a table (e.g., as shown in FIG. 5) according to a first predetermined torque converter fluid level (e.g., 75% of the torque converter's volume that is available for fluid) and fluid temperature. The model outputs the first threshold amount of time according to the fluid temperature and the torque converter fluid level. If method 400 judges that the value of the soak timer (e.g., the amount of time that the vehicle was most recently not activated) is greater than (G.T.) the first threshold amount of time, the answer is yes and method 400 proceeds to 410. Otherwise, the answer is no and method 400 proceeds to 422.

In an alternative example, method 400 may judge if an amount of fluid in the torque converter is less than a first threshold amount (e.g., 75% of the torque converter's volume). In one example, the first threshold amount of fluid volume is determined via referencing the empirical model that is in the form of a table (e.g., as shown in FIG. 5) according to a total amount of time since the vehicle was most recently deactivated and fluid temperature. The model outputs the amount of fluid in the torque converter according to the fluid temperature and the total amount of time since the vehicle was most recently deactivated. If method 400 judges that the value of the amount of fluid in the torque converter is less than (L.T.) the first threshold amount of fluid, the answer is yes and method 400 proceeds to 410. Otherwise, the answer is no and method 400 proceeds to 422.

At 410, method 400 reads the soak timer value and determines if the vehicle soak time is greater than a second threshold amount of time. The second threshold amount of time may be output from a torque converter model that estimates an amount of fluid that is held within the torque converter. The second threshold amount of time may be greater than the first threshold amount of time and the second threshold amount of time may be adapted to increase or decrease depending on the comparison between torque converter impeller speed and torque converter turbine speed determined at 416 and 442. In one example, the second threshold amount of time is determined via referencing an empirical model that is in the form of a table (e.g., as shown in FIG. 5) according to a second predetermined torque converter fluid level (e.g., 50% of the torque converter's volume that is available for fluid) and fluid temperature. The model outputs the second threshold amount of time according to the fluid temperature and the torque converter fluid level. If method 400 judges that the value of the soak timer (e.g., the amount of time the vehicle was most recently not activated) is greater than (G.T.) the second threshold amount of time, the answer is yes and method 400 proceeds to 412. Otherwise, the answer is no and method 400 proceeds to 432.

In an alternative example, method 400 may judge if an amount of fluid in the torque converter is less than a second threshold amount (e.g., 50% of the torque converter's volume). In one example, the second threshold amount of fluid volume is determined via referencing the empirical model that is in the form of a table (e.g., as shown in FIG. 5) according to a total amount of time since the vehicle was most recently deactivated and fluid temperature. The model outputs the amount of fluid in the torque converter according to the fluid temperature and the total amount of time since the vehicle was most recently deactivated. If method 400 judges that the value of the amount of fluid in the torque converter is less than (L.T.) the second threshold amount of fluid, the answer is yes and method 400 proceeds to 432. Otherwise, the answer is no and method 400 proceeds to 412.

At 412, method 400 judges if battery SOC is less than (L.T.) a threshold level. In one example, SOC may be determined via battery voltage and/or coulomb counting. If method 400 judges that battery SOC is less than a threshold level, the answer is yes and method 400 proceeds to 432. Otherwise, the answer is no and method 400 proceeds to 414.

At 414, method 400 rotates the torque converter impeller via rotating the ISG at an idle speed of the engine (e.g., 600 RPM). The ISG is operated in a speed control mode where ISG speed follows a desired speed and ISG torque is varied to maintain the desired speed. By operating the ISG at engine idle speed, the torque converter may be filled with fluid quickly. Further, if engine starting is desired to meet driver demand torque or to charge the electric energy storage device, ISG speed and torque converter speed are already at a level where the engine may be coupled to the ISG and torque converter to allow quick torque transfer. Further, engine torque is not needed to accelerate driveline components up to engine idle speed so that the engine may accelerate faster. Method 400 proceeds to 416 after commanding the ISG and rotating the ISG and torque converter impeller at engine idle speed.

At 416, method 400 compares torque converter impeller speed to torque converter turbine speed. In one example, the comparison may be expressed by the equation:

$$Torque\_con\_\Delta = Torque\_imp\_RPM - Torque\_tur\_RPM$$

where Torque_con_Δ is the difference between the torque converter impeller speed and the torque converter turbine speed, Torque_imp_RPM is the torque converter impeller speed, and Torque_tur_RPM is the torque converter turbine speed. Method 400 proceeds to 418.

At 418, method 400 judges if a fluid level in the torque converter is less than is expected. In one example, if the speed difference determined at 416 is greater than a threshold amount, the speed difference may be indicative of inaccuracies in a torque converter fluid drainage model. Therefore, parameters of the torque converter fluid drainage model may be adapted. If method 400 judges that the speed difference is greater than a threshold, the answer is yes and method 400 proceeds to 420. Otherwise, the answer is no and method 400 proceeds to 422.

At 420, method 400 adapts parameters of the torque converter drainage model. In one example, the torque converter drainage model may be expressed via a table or function. The table may be a three dimensional table as shown in FIG. 5. If the speed difference is greater than a threshold and positive, then values in the table or function at the locations referenced at 410 based on fluid temperature and the second predetermined torque converter fluid level may be reduced (e.g., the time output from the table at 410 representing the second threshold time may be reduced). If the speed difference is less than a threshold and negative, then values in the table or function at the locations referenced at 410 based on fluid temperature and the second predetermined torque converter fluid level may be increased (e.g., the time output from the table at 410 representing the second threshold time may be increased). Method 400 proceeds to 422 after adapting values in the torque converter drain model.

At 422, method 400 zeros the vehicle soak timer (e.g., sets the soak timer value to a value of zero). In addition, method 400 operates the ISG and/or the engine to meet driver demand torque if driver demand torque is non-zero or less than a threshold value of torque. If the driver demand torque is zero or lower than the threshold torque, the ISG and/or engine may be operated in a speed control mode where ISG and/or engine speed is controlled to an engine idle speed. Method 400 proceeds to exit.

At 432, method 400 starts the engine and accelerates the engine to idle speed. The engine rotates the torque converter impeller by combusting fuel and it begins to charge the battery or electric energy storage device. Method 400 proceeds to 422.

At 430, method 400 judges if battery SOC is less than (L.T.) a threshold level. In one example, SOC may be determined via battery voltage and/or coulomb counting. If method 400 judges that battery SOC is less than a threshold level, the answer is yes and method 400 proceeds to 432. Otherwise, the answer is no and method 400 proceeds to 440.

At 440, method 400 rotates the torque converter impeller via the ISG. The ISG is operated in a speed control mode and the engine is not activated (e.g., not combusting fuel). The ISG is rotated at a speed that is output from a lookup table that is referenced by or indexed by the estimated amount of fluid stored in the torque converter. The estimated amount of fluid stored in the torque converter is determined as described at 420. Values in the table are empirically determined via repeatedly soaking the vehicle and monitoring how long it takes for the torque converter to provide a desired speed difference between the torque converter impeller and the torque converter turbine when the ISG is rotated at different speeds. Method 400 proceeds to 442 after rotating the ISG and the torque converter impeller.

At 442, method 400 compares torque converter impeller speed to torque converter turbine speed as described at 416. Method 400 proceeds to 444.

At 444, method 400 judges if a fluid level in the torque converter is less than is expected. In one example, if the speed difference determined at 442 is greater than a threshold amount, the speed difference may be indicative of inaccuracies in a torque converter fluid drainage model. For example, if the speed difference between torque converter impeller speed and torque converter turbine speed is greater than a threshold speed, it may be indicative of a lower fluid level in the torque converter than is expected. Therefore, parameters of the torque converter fluid drainage model may be adapted. If method 400 judges that the speed difference is greater than a threshold, the answer is yes and method 400 proceeds to 446. Otherwise, the answer is no and method 400 proceeds to 422.

At 446, method 400 updates the torque converter soak model. In one example, the torque converter drainage model may be expressed via a table or function. The table may be a three dimensional table as shown in FIG. 5. If the speed difference is greater than a threshold and positive, then values in the table or function at the locations referenced at 408 based on fluid temperature and the first predetermined torque converter fluid level may be reduced (e.g., the time output from the table at 408 representing the first threshold time may be reduced). If the speed difference is less than a threshold and negative, then values in the table or function at the locations referenced at 408 based on fluid temperature and the first predetermined torque converter fluid level may be increased (e.g., the time output from the table at 408 representing the second threshold time may be increased). Method 400 proceeds to 422 after adapting values in the torque converter drain model.

In this way, method 400 selectively operates an ISG and engine to fill a torque converter with fluid so that vehicle launch may be improved. The ISG may be rotated at a speed that is a function of an amount of fluid that is estimated to be held within the torque converter. If little fluid has drained from the torque converter, the ISG may be held at zero speed until driver demand torque increases.

Thus, the method of FIG. 4 provides for a powertrain operating method, comprising: via a controller, rotating a torque converter impeller during a vehicle activation sequence while a vehicle soak time is indicative of less than a threshold amount of fluid in a torque converter; and via the controller, not rotating the torque converter impeller during the vehicle activation sequence while the vehicle soak time is indicative of more than the threshold amount of fluid in the torque converter. The powertrain operating method includes where the vehicle activation sequence is performed in response to a request to start a vehicle, and where driver demand torque is less than a threshold amount of torque when rotating and not rotating the torque source. The powertrain operating method includes where the vehicle activation sequence prepares torque sources (e.g., the internal combustion engine and electric machines) to deliver power to a vehicle powertrain. The powertrain operating method includes where vehicle activation sequence includes supplying electrical power to an inverter that is electrically coupled to an electric machine that selectively supplies torque to a vehicle powertrain. The powertrain operating method further comprises operating an electric machine in a speed control mode to rotate the torque converter impeller during the vehicle activation sequence. The powertrain operating method includes where the electric machine is rotated at a speed according to an estimate of an amount of fluid in the torque converter. The powertrain operating method includes where the estimate of the amount of fluid in the torque converter is based on an amount of time a vehicle is deactivated. The powertrain operating method includes where the vehicle is deactivated when torque sources of the vehicle are not provided with an energy source to operate.

The method of FIG. 4 also provides for a powertrain operating method, comprising: updating parameters of a torque converter fluid draining model responsive to a difference between a torque converter impeller speed and a torque converter turbine speed, the speed difference occurring during a first vehicle activation sequence; and rotating or not rotating a torque converter impeller during a second vehicle activation sequence according to a first threshold amount of time that is based on the torque converter fluid draining model. The method includes where the torque converter impeller is rotated via an electric machine that is operated in a speed control mode during a vehicle activation sequence. The method includes where the vehicle activation sequence supplies power to a torque source that selectively supplies power to a powertrain. The method includes where the parameters include a filter parameter. The method further comprises rotating the torque converter impeller during the second vehicle activation sequence via an engine in response to a battery state of charge being less than a threshold state of charge. The method further comprises rotating or not rotating a torque converter impeller during the second vehicle activation sequence according to a second threshold amount of time that is based on the torque converter fluid draining model.

Referring now to FIG. 5, an example of an empirically based torque converter drainage model is shown. In this example, the torque converter drainage model 500 includes a first axis 502, a second axis 504, and a third axis 506. The first axis represents a level of fluid in the torque converter and the level of fluid in the torque converter increases in the direction of the first axis arrow. The second axis represents an amount of time since a most recent vehicle deactivation and the amount of time since the most recent vehicle deactivation increases in the direction of the second axis arrow. The third axis represents a torque converter fluid temperature and the torque converter fluid temperature increases in the direction of the third axis arrow.

Table 500 includes data 510 arranged in table cells that describe leakage of fluid from the torque converter when the transmission pump is not operating. The data may be different values that describe the relationship between fluid temperature, torque converter fluid level, and time since the most recent vehicle deactivation. If it is determined that values of data in the table need to be adapted, then the values may be increased or decreased by a predetermined amount to improve the model and provide a desired level of vehicle response.

Referring now to FIG. 6, a plot of speed versus time is shown. The vertical axis represents speed and speed increases in the direction of the vertical axis. The horizontal axis represents time and time increases in the direction of the horizontal axis. The plot shows torque converter impeller speed and turbine speed during an engine start for conditions when the torque converter is nearly filled with fluid. Curve 602 represents torque converter impeller speed. Curve 604 represents torque converter turbine speed.

Notice that the torque converter turbine speed accelerates nearly as quickly as the torque converter impeller accelerates. The significant volume of fluid in the torque converter allows efficient energy transfer from the torque converter impeller to the torque converter turbine. Consequently, the torque converter turbine speed lags the torque converter impeller speed by only a small amount of time. Such operation may be desirable because engine torque and/or electric machine torque may be transferred to vehicle wheels quickly and efficiently so that the vehicle may launch quickly from stop.

Referring now to FIG. 7, a plot of speed versus time is shown. The vertical axis represents speed and speed increases in the direction of the vertical axis. The horizontal axis represents time and time increases in the direction of the horizontal axis. The plot shows torque converter impeller and turbine speeds during an engine start for conditions when the torque converter includes a lower amount of fluid (e.g., less than 75% of the torque converter's fluid capacity). Curve 702 represents torque converter impeller speed. Curve 704 represents torque converter turbine speed.

In this example, the torque converter turbine speed accelerates much later than the torque converter impeller accelerates. The lesser amount or volume of fluid in the torque converter lowers energy transfer from the torque converter impeller to the torque converter turbine. As a result, the torque converter turbine speed significantly lags the torque converter impeller speed. Such operation may be less desirable because engine torque and/or electric machine torque may be transferred to slower to vehicle wheels so that the vehicle may launch may be delayed, which may be less desirable.

Referring now to FIG. 8, a plot that shows an example of how ISG speed may be increased with an increasing difference between torque converter impeller speed and torque converter turbine speed (e.g., as described at 440 of FIG. 4). The ISG speed may be increased to increase output of the torque converter pump to fill the torque converter more quickly so that the torque converter responds in a desired way.

The vertical axis represents ISG speed and ISG speed increases in the direction of the vertical axis arrow. The horizontal axis represents a speed difference between torque converter impeller speed and torque converter turbine speed.

It may be observed that ISG speed is increased as the speed difference between torque converter impeller speed and torque converter turbine speed increases. The torque converter pump flow or output may increase as a speed of the torque converter pump increases. The torque converter pump increases speed when the ISG speed or engine speed is increased since the torque converter impeller is coupled to the torque converter pump. Consequently, if the fluid amount in the torque converter is low, the speed difference between the torque converter impeller and the torque converter turbine will be larger so that ISG speed will be increased by a larger amount so as to fill the torque converter with fluid and reduced the speed difference between the torque converter impeller and the torque converter turbine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A powertrain operating method, comprising:
    via a controller, rotating a torque converter impeller during a vehicle activation while a vehicle soak time is indicative of less than a threshold amount of fluid in a torque converter; and
    via the controller, not rotating the torque converter impeller during the vehicle activation while the vehicle soak time is indicative of more than the threshold amount of fluid in the torque converter.

2. The powertrain operating method of claim 1, where the vehicle activation is performed in response to a request to start a vehicle, and where driver demand torque is less than a threshold amount of torque when rotating and not rotating the torque converter impeller.

3. The powertrain operating method of claim 1, where the vehicle activation includes supplying electric power to vehicle torque sources to deliver power to a vehicle powertrain.

4. The powertrain operating method of claim 1, where vehicle activation includes supplying electrical power to an inverter that is electrically coupled to an electric machine that selectively supplies torque to a vehicle powertrain.

5. The powertrain operating method of claim 1, further comprising operating an electric machine in a speed control mode to rotate the torque converter impeller during the vehicle activation.

6. The powertrain operating method of claim 5, where the electric machine is rotated at a speed according to an estimate of an amount of fluid in the torque converter.

7. The powertrain operating method of claim 6, where the estimate of the amount of fluid in the torque converter is based on an amount of time a vehicle is deactivated.

8. The powertrain operating method of claim 7, where the vehicle is deactivated when torque sources of the vehicle are not provided with an energy source to operate.

9. A powertrain operating method, comprising:
    updating parameters of a torque converter fluid draining model responsive to a difference between a torque converter impeller speed and a torque converter turbine speed, the speed difference occurring during a first vehicle activation; and
    rotating or not rotating a torque converter impeller via an electric machine during a second vehicle activation according to a first threshold amount of time that is based on the torque converter fluid draining model.

10. The method of claim 9, where the torque converter impeller is rotated via the electric machine operating in a speed control mode during the first vehicle activation.

11. The method of claim 10, where the first vehicle activation includes supplying power to a torque source that selectively supplies power to a powertrain.

12. The method of claim 9, where the parameters include values in a table that describes torque converter fluid drainage.

13. The method of claim 9, further comprising rotating the torque converter impeller during the second vehicle activation via an engine in response to a battery state of charge being less than a threshold state of charge.

14. The method of claim 9, further comprising rotating or not rotating a torque converter impeller during the second vehicle activation according to a second threshold amount of time that is based on the torque converter fluid draining model.

15. A system, comprising:
    an engine;
    an integrated starter/generator (ISG);
    a driveline disconnect clutch coupled to the engine and the ISG;
    a transmission including a torque converter coupled to the ISG, the torque converter including an impeller and a turbine; and
    a controller including executable instructions stored in non-transitory memory to rotate the impeller at a first speed via the controller for vehicle soak times greater than a first amount of time and less than a second amount of time, and to rotate the impeller at a second speed for vehicle soak times greater than the second amount of time via the controller.

16. The system of claim 15, where the vehicle soak times greater than the first amount of time and less than the second amount of time are time periods during which energy is not supplied to all vehicle powertrain torque sources and a vehicle that includes the engine and the ISG is stationary.

17. The system of claim 15, where the first speed is less than the second speed.

18. The system of claim 15, further comprising additional instructions to rotate the impeller via the ISG in a speed control mode and not via the engine.

19. The system of claim 18, where the ISG is rotated at an idle speed of the engine.

20. The system of claim 15, further comprising additional instructions to rotate the impeller via the engine in a speed control mode in response to a battery state of charge less than a threshold.

* * * * *